United States Patent [19]

Nemunaitis et al.

[11] Patent Number: 5,098,780
[45] Date of Patent: Mar. 24, 1992

[54] CORROSION RESISTANT LININGS FOR CONCRETE SURFACES

[75] Inventors: Bradley R. Nemunaitis, Richmond Hts.; Thomas A. Geriak, Parma, both of Ohio

[73] Assignee: Sandoz Ltd., Basle, Switzerland

[21] Appl. No.: 628,078

[22] Filed: Dec. 13, 1990

[51] Int. Cl.$^5$ .................. B32B 13/00; B32B 27/40; C08L 63/00; B05D 3/02
[52] U.S. Cl. ................. 428/312.4; 428/425.5; 428/424.4; 428/703; 528/64; 523/428; 427/386; 427/393.6
[58] Field of Search ................ 428/312.4, 413, 425.5, 428/424.4; 528/64; 523/428; 524/871; 427/386, 393.6

[56] References Cited

U.S. PATENT DOCUMENTS

| | | | |
|---|---|---|---|
| 4,229,497 | 10/1980 | Piazza | 428/312.4 |
| 4,514,467 | 4/1985 | Reimer et al. | 428/413 |
| 4,554,299 | 11/1985 | Liggett | 528/64 |
| 5,011,903 | 4/1991 | Lymburner et al. | 524/871 |

Primary Examiner—P. C. Sluby
Attorney, Agent, or Firm—Gerald D. Sharkin; Richard E. Vila; Walter F. Jewell

[57] ABSTRACT

Method of enhancing the concrete crack-bridging ability of a corrosion resistant lining for concrete surfaces by applying a crack-bridging basecoat to the concrete surfaces.

1 Claim, No Drawings

CORROSION RESISTANT LININGS FOR CONCRETE SURFACES

This invention relates to concrete coatings. In one particular aspect, it relates to corrosion resistant linings for concrete surfaces.

BACKGROUND OF THE INVENTION

Normally, concrete surfaces which are exposed to corrosive materials such as salt, mineral acids, organic acids, caustics and solvents, are coated with conventional polyester, epoxys or vinylesters to protect them from the corrosive materials. However, in use the concrete surfaces are subjected to thermal cycles, traffic loads and other elements which cause both the protective coatings and the concrete surface to crack. This cracking exposes the concrete to the corrosive materials with subsequent deterioration of the concrete.

There is, therefore, a need for concrete coatings which are corrosion protectors that will withstand the various stresses placed upon the concrete by bridging crack formations in the concrete.

SUMMARY OF THE INVENTION

This invention provides a method for enhancing the concrete crack-bridging ability of a corrosion resistant lining for concrete surfaces by applying a crack-bridging basecoat to concrete surfaces, which basecoat is covered by conventional corrosion resistant coatings.

The crack-bridging basecoat comprises a urethane cross-linked with an epoxy and amines. The basecoat of this invention provides from about a 50% to about 400% elongation in crack-bridging ability over conventional coatings.

The crack-bridging formulations of this invention comprise formulations A and B. Formulation A comprises from about 15% to about 40% of an epoxy resin, e.g., bisphenol A epoxy; from about 40% to about 65% of a flexibilizing agent, e.g., phenol blocked isocyanate; from about 5% to about 15% of an adhesion promoter for polyesters and vinylesters, e.g., urethane acrylate; from about 5% to about 15% of a solvent, e.g., methylisobutylketone; from about 0.05% to about 0.15% of defoaming-flow agents, e.g., silicone-free air release additive; from about 2% to about 4% of a pigment, e.g., titanium dioxide, $TiO_2$; from about 0.1% to about 0.2% of an adhesion promoter, e.g., vinyl silane; from about 0.1% to about 0.3% of a suspending additive, e.g., salt solution of unsaturated polyamine amide in high molecular weight acidic esters; from about 0.2% to about 2% of a thixotropic agent, e.g., aramid fiber; and from about 0.05% to about 2% of carbon black.

Formulation A is mixed with a curative system formulation B comprising from about 60% to about 80% of a modified cycloaliphatic amine; and from about 20% to about 40% of a modified aliphatic polyamine.

The mix ratio of formulation A to formulation B is:
By weight from about 10:1 to about 2:1
By volume from about 10:1 to about 2:1

The following are the preferred formulations of the inventions:

| | Horizontal Surfaces % | Vertical Surfaces % |
|---|---|---|
| Formulation A | | |
| bisphenol A epoxy (DER 331) | 24.38 | 24.15 |
| phenol-blocked isocyanate (Desmocap 12A) | 53.59 | 53.09 |
| urethane acrylate (Ancarez 300A) | 9.74 | 9.65 |
| methyisobutyketone | 8.28 | 8.20 |
| defoaming-flow agent (BYK-A525) | 0.10 | 0.10 |
| $TiO_2$ | 2.93 | 2.90 |
| Vinyl silane (DOW Z-6032) | 0.15 | 0.14 |
| Suspending Additive (BYK-Anti-Terra U-80) | 0.19 | 0.19 |
| Aramid fiber (Kevlar Pulp) | 0.50 | 1.45 |
| Carbon black | 0.14 | 0.14 |
| | 100.00 | 100.00 |
| Formulation B (Curative) | | |
| Modified cycloaliphatic amine (Anchor 1693) | 74.00 | 74.00 |
| Modified aliphatic polyamine (Anchor K-54) | 26.00 | 26.00 |
| | 100.00 | 100.00 |
| Mix Ratio Formulation A:B | | |
| By weight | 5:1 | 5:1 |
| By Volume | 5:1 | 5:1 |

When using the formulations of this invention on vertical surfaces, additional amounts of the thixotropic agent (aramid fiber) are used to support the formulation until cured.

In use, the formulations A and B are mixed and applied to a concrete surface. When cured, the convention corrosion resistant coatings are applied over the formulation of the invention. The complete lining system may consist of the present flexible basecoat over the concrete surface, a conventional reinforced layer, and a top chemical resistant layer. This crack-bridging ability of the invention formulations has been found to withstand concrete movement of greater magnitude than conventional systems.

What is claimed is:

1. A method of enhancing the crack-bridging ability of a corrosion resistant lining for concrete surfaces which comprises applying as a base coat of a corrosion resistant lining to a concrete surface a composition comprising; formulation A comprising, from about 24.15% to about 24.38% of a bisphenol A epoxy; from about 53.09% to about 53.59% of a phenolblocked isocyanate; from about 9.65% to about 9.74% of urethane acrylate; from about 8.20% to about 8.28% of methyisobutylketone; about 0.10% of siliane-free air release agent; from about 2.90% to about 2.93% of $TiO_2$; from about 0.14% to about 0.15% vinyl silane; about 0.19% of a salt solution of unsaturated polyamine amide in high molecular weight acidic esters; from about 0.50% to about 1.45% of aramid fiber; and about 0.14% carbon black; formulation B comprising, about 74% of modified cycloaliphatic amine; and about 26% of a modified aliphatic polyamine; mixing formulations A and B in a weight ratio of about 5:1 of A and B respectively, before applying the formulations as a basecoat to the concrete surface.

* * * * *